United States Patent [19]
Khudenko

[11] Patent Number: 5,846,424
[45] Date of Patent: *Dec. 8, 1998

[54] BIOLOGICAL TREATMENT OF MATERIALS

[75] Inventor: Boris Mikhailovich Khudenko, Atlanta, Ga.

[73] Assignee: Khudenko Engineering, Inc., Atlanta, Ga.

[*] Notice: The term of this patent shall not extend beyond the expiration date of Pat. No. 5,514,277.

[21] Appl. No.: 602,085

[22] Filed: Feb. 15, 1996

Related U.S. Application Data

[63] Continuation-in-part of Ser. No. 181,387, Jan. 13, 1994, Pat. No. 5,514,278, which is a continuation-in-part of Ser. No. 102,618, Aug. 5, 1993, Pat. No. 5,514,277, which is a continuation-in-part of Ser. No. 46,788, Apr. 12, 1993, abandoned.

[51] Int. Cl.$^6$ ....................................................... C02F 3/30
[52] U.S. Cl. ............................ 210/603; 210/605; 210/607; 210/624; 210/629; 210/630
[58] Field of Search ..................... 210/603, 605, 210/607, 629, 615–617, 622–626, 610, 611, 630, 631

[56] References Cited

U.S. PATENT DOCUMENTS

| | | | |
|---|---|---|---|
| 4,193,866 | 3/1980 | Slusarczuk et al. | 210/625 |
| 4,200,524 | 4/1980 | Levin | 210/616 |
| 4,824,563 | 4/1989 | Iwahori et al. | 210/605 |
| 4,919,815 | 4/1990 | Copa et al. | 210/631 |
| 4,999,111 | 3/1991 | Williamson | 210/624 |
| 5,057,220 | 10/1991 | Harada et al. | 210/605 |
| 5,160,043 | 11/1992 | Kos | 210/605 |
| 5,192,442 | 3/1993 | Piccirillo | 210/605 |
| 5,213,681 | 5/1993 | Kos | 210/605 |
| 5,246,585 | 9/1993 | Meiring | 210/630 |
| 5,288,405 | 2/1994 | Lamb, III | 210/625 |

*Primary Examiner*—Thomas G. Wyse

[57] ABSTRACT

A method of biological treatment of materials by a combination of at least two groups of microorganisms forming sludges in at least two biological treatment zones treating the said materials wherein for purposes of increasing the treatment efficiency and stability at least one said sludges is conditioned in at least one sludge conditioning zone, whereby converting at least a fraction of at least one said group of organisms into organisms of another group, and thus forming the conditioned sludge, and the said conditioned sludge is fed in at least one said biological treatment zone.

19 Claims, 4 Drawing Sheets

BIOLOGICAL TREATMENT OF MATERIALS

CROSS-REFERENCE TO RELATED APPLICATIONS

This application is a continuation-in-part of the application by the same inventor, filed Jan. 13, 1994 under Ser. No. 08/181,387, now U.S. Pat. No. 5,514,278 which is a continuation in part of the application, filed Aug. 5, 1993, under Ser. No. 08/102,618, now U.S. Pat. No. 5,514,277 which is a continuation in part of the application, filed Apr. 12, 1993, under Ser. No. 08/046,788, abandoned.

FIELD OF INVENTION

The invention belongs to biological treatment of materials (wastewater, solid organic waste, organic feedstock for production of combustible gases and fermented chemicals) in systems with multiple biological treatment zones.

BACKGROUND

Wastewater treatment systems with two sequential aerobic stages, for example a high rate biofilter and an activated sludge process, or two-stage activated sludge process are commonly used for treatment of concentrated wastewater for many decades. Sequential anaerobic-aerobic systems were also tested several decades ago. Some recent improvements of such systems are described in U.S. Pat. Nos. 4,491,522, 4,824,563 4,919,815 and 5,192,442.

The known multistage biological treatment methods have the following disadvantages:

- biodegradation processes are uncontrollable and unstable;
- treatment systems are operationally inflexible;
- the desirable sludge mass is difficult to maintain in many treatment systems;
- population balances among various groups of organisms cannot be optimized;
- multiple, complex, and expensive sludge separation means are required after each stage;
- volatile constituents are emitted from the treatment processes;
- removal of nitrogen and phosphorus is poorly controlled;
- removal of recalcitrant organics is not efficient;
- in some processes, large quantities of waste sludge are generated;
- in some processes, oxygen requirements are very high;

OBJECTIVES

The main objective of the present invention is to increase the process efficiency and stability. This is achieved by providing flexibility to treatment systems, by creating conditions to maintain the desirable sludge mass and to optimize the population balances in the biomass in treatment systems.

Yet the other objective of this invention is to provide controllable method for removal of nitrogen and phosphorus, removal of recalcitrant organics, reduction of volatile emissions, reduction of the waste sludge mass and volume, and minimization of aeration requirements.

Other objectives and advantages of the present invention will become clear from the ensuing description.

SUMMARY OF INVENTION

This is a method of biological treatment of materials by a combination of at least two groups of microorganisms which form sludges in at least two biological treatment zones treating the said materials. At least one of the said sludges is conditioned in at least one sludge conditioning zone. The conditioning results in converting at least a fraction of at least one said group of organisms into organisms of another group. Thus, the conditioned sludge is formed. The said conditioned sludge is fed in at least one said biological treatment zone.

In this method, the said materials can be water, wastewater, aqueous industrial, agricultural and production materials, industrial, agricultural and production gases including polluted air, gaseous and vent emissions, solid waste, materials of plant, animal, or fossil origin, and solid industrial, agricultural or production streams, and combinations thereof.

The said biological treatment zones can form sequential treatment zones, parallel treatment zones, parallel-sequential treatment zones, or can be arranged as a race track. Recirculation of said materials and said sludges among and between said biological treatment zones can be used. The biological treatment zones in this method can be a single biological reactor, a biological reactor-sludge separation system, a biological reactor-sludge separation-sludge recycle system, biological reactors with internal recycles of the said materials and the said sludges.

Biological reactors used in this method can be completely mixed stirred reactors, plug flow reactors, diffusional flow reactors, multichamber reactors, packed bed upflow reactors, packed bed downflow recators, suspended sludge blanket reactors, fluidized bed reactors, expanded bed reactors, reactors with rotating contact media, reactors with internal recirculation of the said materials and the said sludges. The said biological reactor-sludge separation system is provided with multiple sludge separation means.

In reaction and sludge conditioning zones, the attached growth and suspended growth sludges can be used according to this method. The said sludges can comprise obligate aerobic, facultative aerobic, anoxic, facultative anaerobic, and obligate anaerobic microorganisms. Further, the said microorganisms can be psycrophylic, mesophylic, and thermophylic microorganisms. Yet further, the said sludges can include autotrophic, heterotrophic, and methanotrophic microorganisms and combinations thereof.

The sludge conditioning zones can be made of a single tank reactor and a multiple tank reactor. The multiple tank reactor can consist of sequential reactors, parallel flow equal volume reactors, parallel flow unequal volume reactors, or combinations of these reactors. The sludge conditioning zone further can include at least one bypass line. Multiple sludge conditioning zones can be included in the system. Each such zone can be used for a separate conditioning of sludges originated in different biological treatment zones, or a split-flow conditioning of at least one sludge in multiple conditioning zones can be conducted.

PREFERRED EMBODIMENTS

Figure 1:
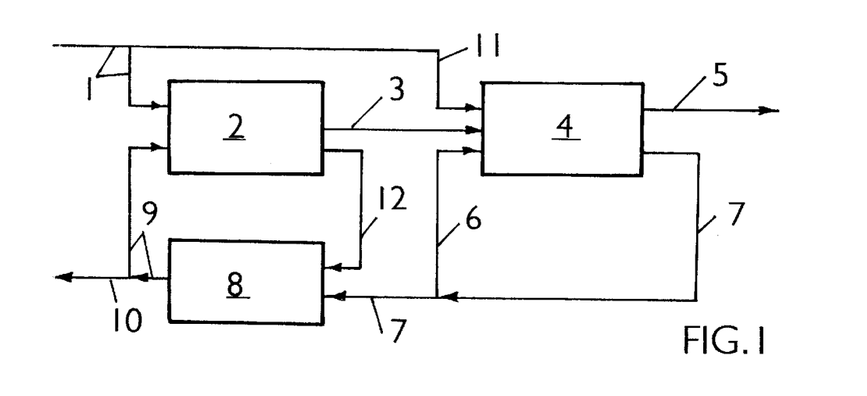
FIG. 1 is a flow sheet of a system with two biological treatment zones and a single sludge conditioning zone.

Referring now to FIG. 1, there is shown a flow sheet of a system with two biological treatment zones and a single sludge conditioning zone. The system comprises a line 1 conveying the influent to a first biological treatment zone 2, a line 3 connecting the first biological treatment zone 2 to the second biological treatment zone 4, and optional line 11 for feeding part of the influent in the second biological treatment zone 4, a line 7 for feeding the sludge originated in zone 4 into sludge conditioner 8, an optional branch 6 for sludge recyde within the second biological treatment zone 4, an optional line 12 for feeding sludge originated in zone 2 into the sludge conditioner 8, line 9 for feeding the conditioned sludge in zone 2, and line 10 for sludge discharge, this line is optionally connected to line 9. Also optionally, a sludge conditioning zone can be provided in line 6 feeding the conditioned sludge in the zone 4, the said zone can be fed with the sludge originated in the zone 4, or in the zone 2, or in both zones 2 and 4. Alternatively, conditioned sludge line 9 can be split to feed the conditioned sludge to both biological treatment zones 2 and 4.

Biological treatment zones can be connected in sequence, as shown in FIG. 1, or they may be parallel, or sequentially-parallel. Other connections can also be used. Various streams, treated effluent, partially treated streams, mixed liquors, separated sludges can be recirculated within, between, and among biological process zones.

Figure 2:
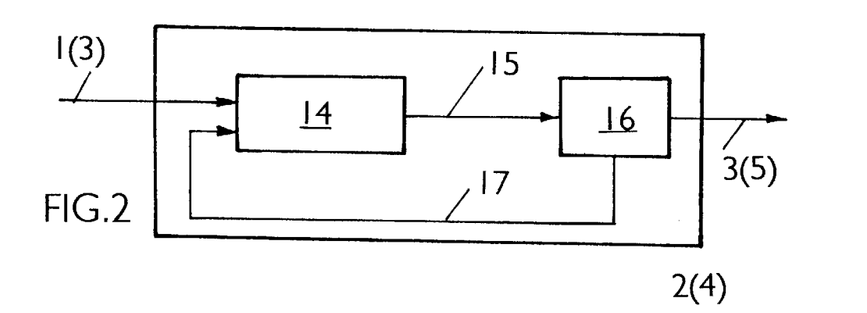
FIG. 2 is a flow sheet of a biological treatment zone.

Referring now to FIG. 2, there is shown a box 2 or 4 [marked 2(4) in FIG. 2] which signifies either the first, 2, or the second, 4, biological treatment zone. A possible structure of either biological treatment zone is shown in this box. As an example, a reactor 14 connected by line 15 to an optional sludge separator 16, and a sludge recycle line 17 are shown. In case of zone 2, feed line 1 and the effluent line 3 are used, while for zone 4, these lines are 3 and 5, respectively.

It is understood that any presently known, described in any documentation, conceived, tested, operated, or a future (to be developed) biological treatment zone can be used. For example, box 2 (4) can be a single flow-through or a batch reactor with attached growth, a reactor with suspended sludge blanket, or other reaction apparatus simultaneously providing sludge separation. Alternatively, suspended sludge growth in a reactor with well-mixed contents can be used. In the latter case, the sludge will not be separated or retained in the biological treatment zone and can be completely transferred to a subsequent process stage, possibly, to a next stage biological treatment zone. Biological treatment zones can also include various recycles of the mixed liquor or separated or partially separated (concentrated) sludges. These zones can be operated entirely without molecular oxygen, as anoxic processes. Other zones can be aerated with air, oxygen, or mixtures thereof.

The system shown in FIGS. 1 and 2 is operated as follows. The stream containing the material to be treated is fed via line 1 in the first biological treatment zone 2 in which the said material is subjected to the action of at least two groups of microorganisms, for example, anaerobic acidogenic and methanogenic. The effluent from the treatment zone 2 (mixed liquor, separated partially treated material, or both) is fed via line 3 in the second biological treatment zone 4 where it undergoes further treatment by the action of at least two groups of microorganisms, for example, anaerobic acidogenic and aerobic, or by nitrite/nitrate reducing and by aerobic organisms. The treated effluent from zone 4 is discharged via line 5. The biomass from the second biological treatment zone 4, optionally as mixed liquor or as separated sludge, is directed from the zone 4 via line 7 in the sludge conditioning zone 8. In zone 8, microorganisms of one group, for example, aerobic, are converted in organisms of another group, for example, anaerobic. Depending on the process needs, mostly acidodens, or mostly methanogens can be generated in the sludge conditioning zone 8. The conditioned sludge is transferred in the biological treatment zone 2 via line 9. Sludge excess is discharged from the system via line 10.

Optionally, a fraction of the influent can be fed in the second biological treatment zone 4 via line 11, a fraction of the biomass from the second biological treatment zone 4 is returned via line 7 and branch 6 in the zone 4, and the biomass from the first biological treatment zone 2 is also directed to the sludge conditioning zone 8 via line 12. These options add to the process flexibility allowing one to optimize the quantity and the make up of biomass in all biological treatment zones and in the entire system.

Figure 3:
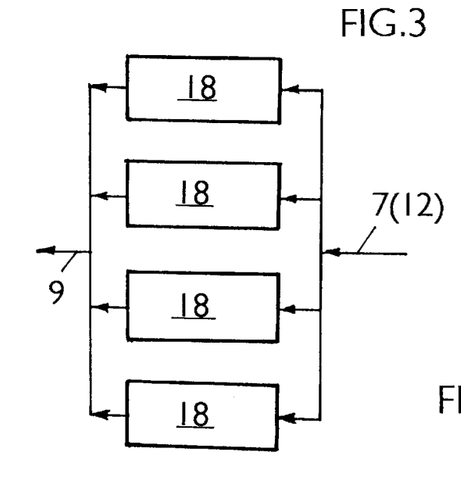
FIG. 3 is a flow sheet of a multichannel sludge conditioning zone with equal parallel reactor tanks.

Referring now to FIG. 3, there is a flow sheet: of a sludge conditioning zone with equal-size multiple parallel channels (reactors, or reaction zones) 18. Each channel is fed with an equal or unequal fraction of the total sludge flow through split lines 6, or 7, or both. Optionally, a bypass line can be provided around channels 18.

Figure 4:
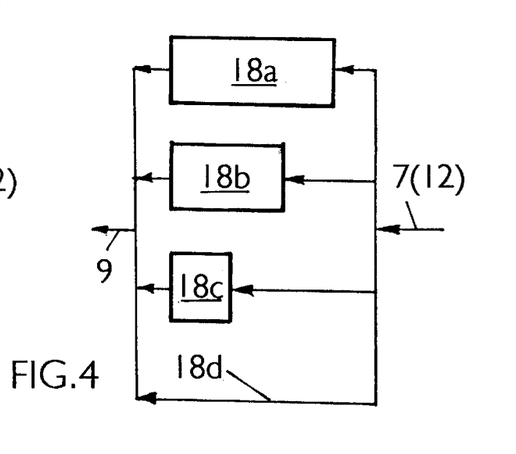
FIG. 4 is a flow sheet of a multichannel sludge conditioning zone with unequal parallel reactor tanks.

Referring now to FIG. 4, there is a flow sheet of a sludge conditioning zone with multiple unequal-size parallel channels 18a to 18d, including a possible zero-volume (bypass) channel 18d. Each channel is fed with an equal or unequal fraction of the total sludge flow through split lines 6, or 7, or both.

Figure 5:
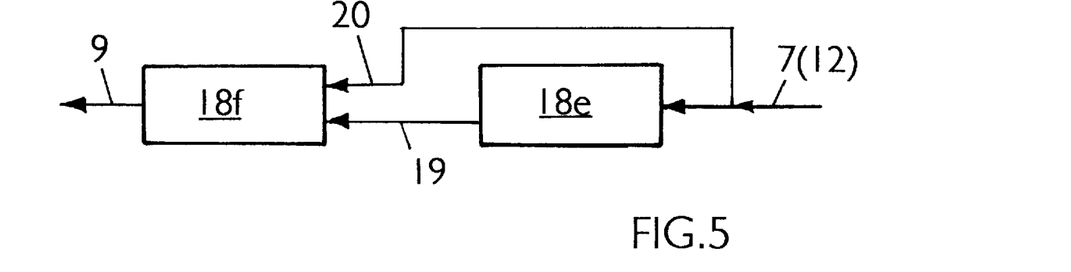
FIG. 5 is a flow chart of a sludge conditioner with consecutive reactor tanks.

Referring now to FIG. 5, there is shown a sludge conditioner with consecutive reactor tanks 18a and 18b. More than two tanks can be used. An optional bypass line 19 around tank 1 8a is shown. Alternatively, the tank 18b, or both tanks can be bypassed.

Sludge conditioning zones of FIGS. 3, and 4 can be used to generate several streams of biomass with various microbial composition. For example, in FIG. 3, channels can be operated at different temperatures, for example, psychrophylic, mesophylic, or thermophylic. Respective groups of organisms generated in each channel will be fed in biological treatment zones to optimize performance of the total process. Aerobic and anaerobic channels can also be used. Sequential channels, as shown in FIG. 5, can be aerobic followed by anaerobic. In such a case, the benefit of the aerobic portion of the conditioning zone is in bioheating. Various other combinations of channels with different conditions can be used. A periodic operation of channels can be beneficial for controlling the uniformity of the sludge age in the system.

Composite layouts of multiple tank sludge conditioners with parallel and sequential tanks, or functional zones, with and without bypasses can also be used. Multiple sludge conditioners of any of the arrangements previously described can be used. For example, a single tank sludge conditioner can be fed with a sludge originated in one biological treatment zone, and another sludge conditioner made of multiple tanks can be fed with a sludge originated in another biological treatment zone, both conditioned sludges can be fed in the same or in different biological treatment zones.

Different groups of microorganisms cultivated in the conditioning zone 8 can be used to optimize the make up of biomass in biological treatment zones. The present invention also provides means for maintaining the desirable amount of biomass in the system. For example, the known anaerobic systems are difficult to use for treating dilute wastewater because the sludge loss in the sludge separation means is greater than the sludge growth in the system. In contrast, the present invention uses two biological treatment zones, for example, anaerobic followed by aerobic. During a period of sludge loss from the anaerobic section, the anaerobic treatment efficiency drops and more organics are available for microorganisms in the second, aerobic, zone. Accordingly, there is a greater growth of aerobic sludge. Moreover, the sludge yield in aerobic processes is greater than in anaerobic processes. The aerobic sludge is directed in the anaerobic sludge conditioning zone where it is at least partially converted to the anaerobic sludge. The resulting sludge yield in the system will be "selfregulated" and greater than that in the anaerobic process alone. Therefore, the total sludge mass in the system will increase and stable operation of systems with low influent concentration becomes possible.

Figure 6:
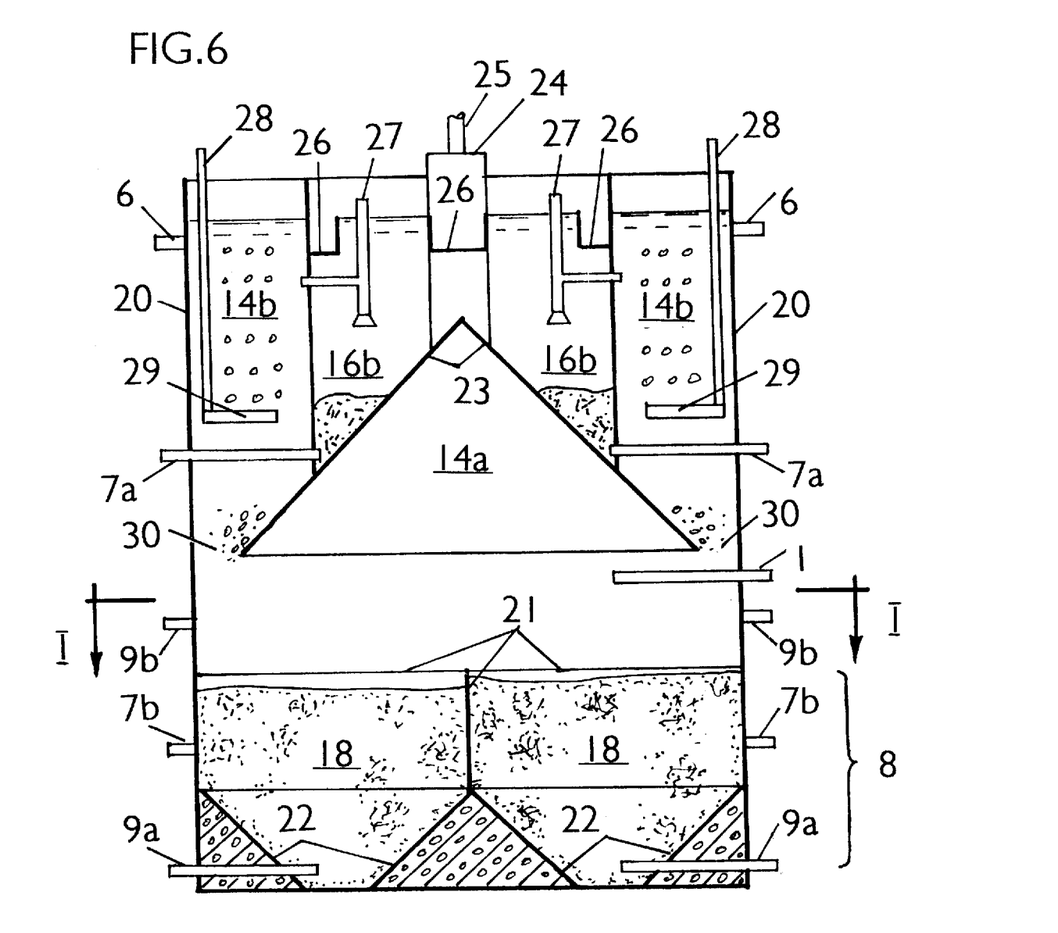
FIG. 6 is a vertical cross-section of an apparatus for carrying out the present method.
Figure 7:
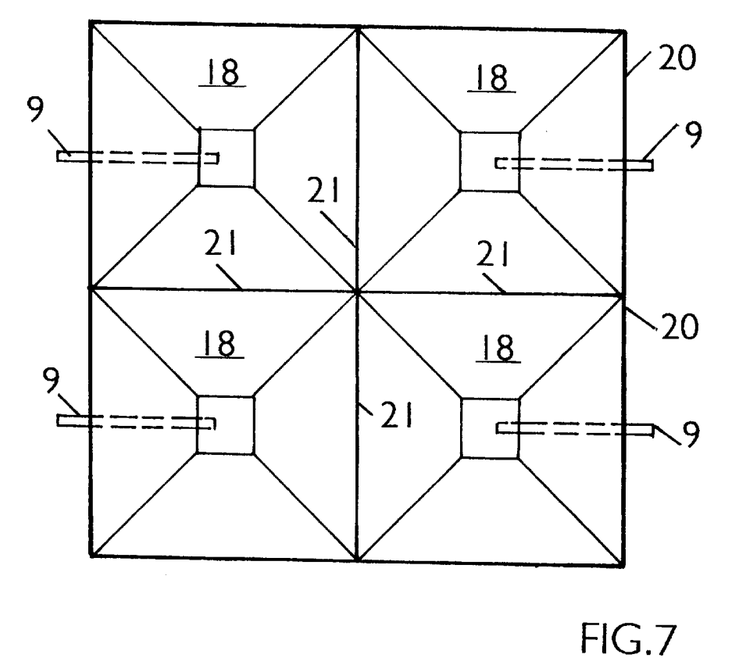
FIG. 7 is a section along lines A—A in FIG. 6.
Figure 8:
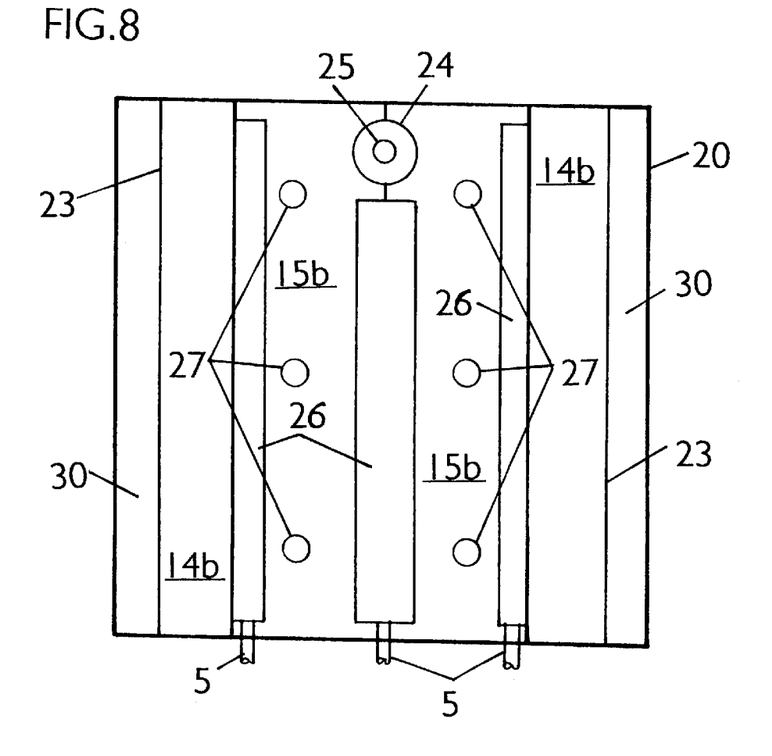
FIG. 8 is a plan view of the apparatus shown in cross-section in FIG. 6.

Referring now to FIGS. 6, 7, and 8 there is shown an apparatus for carrying out the present method. This embodiment illustrates, but not limits, the application of this method to wastewater treatment. The apparatus comprises a rectangular tank 20 with a bottom section used for the sludge conditioning zone 8. This zone is divided by walls 21 into four sludge sections used as equal volume conditioning channels 18. Each section has steep slopes 22 at the bottom and pipes 7b and 9a for feeding sludge for conditioning and for transferring the conditioned sludge from the said conditioning channels 18.

The first biological treatment zone is made of a reaction zone 14a disposed above the sludge conditioning zone 8 and confined by the walls of the tank 20 on its sides and by a roof-like partition 23 at the top. A gap 30 between the lower edge of the partition 23 and the side walls of the tank 20 is provided. A gas collection bell 24 with the gas pipe 25 for collecting and evacuating the digestion gases is attached to an opening in the top of the said roof-like partition 23. The said reaction zone 14a, pipes 1 and 9b are provided for feeding the influent and the conditioned sludge.

The second biological treatment zone is made of reaction zones 14b and sludge separation zones 16b. Reaction zones 14b are provided with aeration means comprising air piping 28 and air dispersion devices 29, and with pipes 27 for transferring mixed liquor from reaction zones 14b to the sludge separator 16b. Troughs for collecting the clarified effluent 26 and pipes 5 for discharging the clarified effluent, and pipes 7a for the evacuation of the settled sludge are provided. It is understood that the said tank 20 can be cylindrical, or of other shape, reaction zones 14a and 14b in the first and the second treatment zones can be subdivided (partitioned) into multiple functional zones, and other design changes can be applied to the present system.

The system shown in FIGS. 6, 7, and 8 is operated as follows. Wastewater, is fed in the anaerobic reaction zone 14a wherein it undergoes a complete or an incomplete treatment, as can be needed. Complete treatment results in as complete anaerobic degradation of the original organics as possible and practicable, and the concentration of volatile fatty acids is very low. Incomplete treatment occurs either when a substantial portion of the original organics and/or a high concentration of volatile fatty acids remains in the effluent from the anaerobic reaction zone. A substantial fraction of various toxic organics, including halogenated, is degraded. Heavy metals are substantially precipitated by sulfides. Some poorly degradable (recalcitrant) organics are adsorbed by the biomass. Anaerobic biomass in the reactor zone 14a comprises acidogenic and methanogenic organisms. Acidogenic organisms are grown largely in this zone. Methanogenic organisms are partially grown in this zone and partially conveyed to this zone from the sludge conditioning compartments 18. Besides anaerobic microorganisms, the sludge can incorporate other microorganisms, (for example, organisms transferred from the aerobic process zones), suspended organic and inorganic particles. The sludge in zone 14a is mixed with the wastewater.

A fraction of the biomass in the reaction zone 14a settles down in multiple compartments 18 of the sludge conditioning zone. In these compartments, a fraction of acidogenic and aerobic biomass (if aerobic biomass is present) dies off. Dissolved, suspended, and adsorbed organics are converted into products of digestion. Further degradation of poorly degradable adsorbed organics also occurs. Predominantly methanogenic organisms grow and accumulate. Accordingly, the conditioned sludge is enriched with methanogens. Optionally, selected compartments 18 can be maintained at thermophylic, mesophylic, or psychrophylic temperatures. Also optionally, selected compartments 18 can be operated at the sludge retention times resulting in generation of acidogenic or methanogenic organisms. Such optional operating regimes provide greater diversity of microorganisms in the sludge conditioning zone 18 and in the reaction zone 14a. Conditioned sludge is recycled to the reaction zone 14b to maintain the proportion of acidogens and methanogens to control the complete or incomplete treatment. Controllable recycle of conditioned sludge can insure the needed partial or complete treatment in the reaction zone 14a. Sludge from compartments 18 can be conveyed via pipes 9a to the reaction zone 14b via pipes 9b. Sludge transfer is simultaneous or from one compartment at a time.

Digestion gases are generated in the reaction zone 14a and compartments 18. Bubbles of these gases rise to the roof-like partition 23. The digestion gas accumulates at the top of this partition, goes in the gas bell 24, and further via line 25 to a gasholder, to a flair, or to other means.

The flows of the anaerobic mixed liquor equal to the influent flow and some digestion gases pass from the anaerobic reaction zone 14a via gap 30 in the aerobic reaction zone 14b. An oxidizer, air, oxygen, or their mixtures, is provided in the reaction zone 14b via pipes 28 and diffusers 29. Aerobic biological treatment of organics remaining in the wastewater after the anaerobic treatment occurs in zone 14b. Methane in the digestion gases transferred to the aerobic reaction zone 14b supports the growth of methanotrophic organisms. These organisms co-metabolize halogenated organics. Mixed liquor is transferred from the reaction zone 14b to the sludge separation zone 16b. Settled sludge from this zone is evacuated via pipes 7a and is fed partially to the sludge conditioning compartments 18 via pipes 7b and is partially returned to the aerobic reaction zone 14b via pipes 6. The clarified effluent is collected by troughs 26 and is evacuated from the system via pipes 5.

The following are advantages of this system. The desirable quantity of the biomass can be provided in all biological treatment zones because the biomass yield in the aerobic treatment zone is greater than in the anaerobic zone. Loss of the anaerobic biomass results in incomplete treatment in the anaerobic treatment zone. More residual organics become available for the aerobic treatment and growth. Accordingly, larger quantity of the aerobic biomass is transferred to the sludge conditioning zone. In this zone, aerobic organisms die off and provide substrate for anaerobic growth, thus resulting in accumulation of the anaerobic biomass. Aerobic-anaerobic control of the total biomass production in the system is especially useful for treatment of low concentration waste when anaerobic growth cannot compensate sludge loss with the effluent. Generation of various groups of organisms in biological treatment zones, their controllable conversion in sludge conditioning zones, and their controllable supply to all biological treatment zones provides means for optimization of compositions of biological consortia. Provisions of the present method for maintaining the desirable total quantity of biomass of the optimal composition insure the process controllability, stability and high performance, and operational flexibility.

Optionally, this system can be operated to control nitrogen and phosphorus, and recalcitrant and toxic organics in the effluent. Emissions of volatile organic hydrocarbons in the ambient air can also be controlled.

Several approaches can be used for nitrogen control. Intermittent aeration in the biological reaction zone 14b can be used. During the aeration period, wastewater is nitrified. When the aeration is turned off, the denitrification occurs. Alternatively, zone 14b can be divided into an anoxic and oxygenated volumes. Nitrification occurs in the oxygenated volume. The nitrified wastewater is recycled in the anoxic volume where it is denitrified. Yet another way of nitrogen removal is by nitrifying in the aerobic zone 14b and recycling either part of the effluent, or the mixed liquor from zone 14b, or the flow of the separated sludge, or all of the above to the anaerobic zone 14a where denitrification occurs. A combination of these methods of nitrogen control can also be used.

Phosphorus can be controlled as follows. The P-removal bacteria are transferred from the aerobic biological treatment zone via pipes 7a and 9b. These bacteria are exposed to anaerobic conditions in the obligately anaerobic zone 14a. This zone is operated in the incomplete treatment regime with volatile fatty acids present in the reactor. Phosphorus release occurs. After that P-removing bacteria with other components of the anaerobic sludge will be transferred to zone 14b where phosphorus is taken up.

This system provides an enhanced removal of recalcitrant and toxic organics. The following factors are instrumental. Sludges and wastewater recycled between zones 14a and 14b and the sludge conditioning channels 18, subjects toxic and recalcitrant organics to a wide range alternating anaerobic-aerobic conditions. This is favorable for dehalogenation, breaking aromatic rings and multiple carbon bonds, splitting various functional groups in organic compounds. Methanotrophic organisms provide additional destruction of halogenated organics. Methane used in this process is generated in the process itself. Moreover, no pumping means are needed to deliver methane in the aerobic zone.

Volatile organics are substantially degraded in this system via the same mechanisms that guide the removal of toxic and recalcitrant organics. As an additional provision, a biological filter can be installed above the aerobic reaction zone 14b. All gases emitted from this zone go to the biofilter. The biofilter is irrigated by the treated effluent. Volatile organics will be additionally degraded in the biofilter.

Due to a substantial reduction of organics in the anaerobic process, the generation of sludge in the total system is greatly reduced. Due to the same reason, the oxygen requirements are also reduced. There is no need in grit removal before the present system because it can accumulate in inverted pyramids at the bottom of the sludge conditioning zone and be easily removed. There is no need in the primary settling of solids because they are incorporated into the anaerobic sludge and are settled to the sludge conditioning channels 18. The settled organic particles are digested in the sludge conditioner. Sludge concentration in the sludge conditioner is very high. There is no need in sludge thickeners or other separation means before and after conditioning.

In a system with two biological treatment zones and a sludge conditioner, only one sludge separator is used. In contrast, conventional treatment plants have up to six sludge or other solids separation devices: (1) grit chambers, (2) primary settling tanks, (3) intermediate clarifiers after the anaerobic stage, (4) secondary clarifiers, (5) sludge thickeners before sludge digestors, and (6) centrifuges after sludge digesters. This greatly reduces the construction volume of the treatment system. Additionally, the new treatment system has very little of very simple mechanical equipment. Usually, only pumps and/or blowers are needed. Therefore, such system can be constructed at a low cost. The system uses significantly less oxygen than conventional anaerobic systems, utilizes its own methane in the process, and produces little sludge for disposal. Accordingly, the operating costs for the system are also very low.

A specific feature of this system is that a mixture of true anaerobic organisms, including obligate anaerobes, and aerobic organisms is present in sludges in all treatment zones and in the sludge conditioning zone. A fraction of organisms can die off in the foreign environments, but a large portion survives. For example, obligate aerobes will partially die off in anaerobic treatment zone. Some organisms can be dormant in specific treatment zones, or be active only part of the time. For example, methanogens in the aerobic treatment zone 14b can be dormant in case of continuous aeration. In case of intermittent aeration, and specifically when oxygen in the mixed liquor is depleted, methanogens can consume fatty acids transferred from the anaerobic treatment zone 14a and generated in the aerobic treatment zone 14b. Aerobic organisms are dormant in the anaerobic reaction zone 14a, but they rejuvenate when returned in the aerobic treatment zone. Acinetobacter, organisms believed to be responsible for phosphorus removal, will release phosphorus in the anaerobic reaction zone 14a operated in the incomplete treatment regime, and will take up more phosphorus in the aerobic reaction zone 14b. Here, the anaerobic reaction zone is different from the "anaerobic" sections in aerobic activated sludge process systems with P-removal. Zone 14a is true, or the obligately anaerobic zone. In contrast, known "anaerobic" sections in the activated sludge processes contain aerobic sludge with some facultative aerobes and anaerobes.

The sludge in the conditioner 8 is enriched with methanogens and has very low content of volatile fatty acids. Accordingly, P-removing bacteria present in the waste aerobic sludge will not release phosphorus upon transfer in the sludge conditioner. Additionally, large quantity of methanogens in the sludge conditioner provides rapid conversion of the aerobic sludge in the sludge conditioner without excessive foaming typical for conventional sludge digestion processes.

In the embodiment given by FIGS. 6, 7, and 8, mixed suspended sludge growth reactors 14a and 14b are described. Alternatively, reactors with various packing types, suspended sludge blankets, fluidized bed reactors, and other reactor types can be used.

Figure 9:
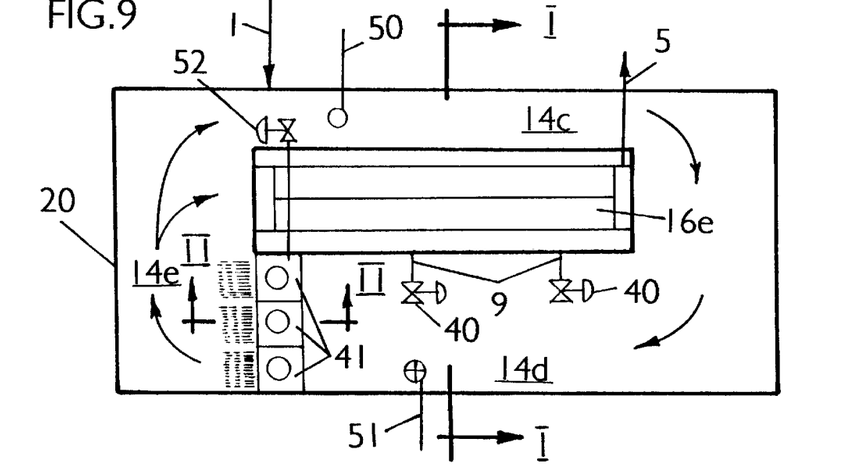
FIG. 9 is a plan view of an alternative apparatus for carrying out the present method.
Figure 10:
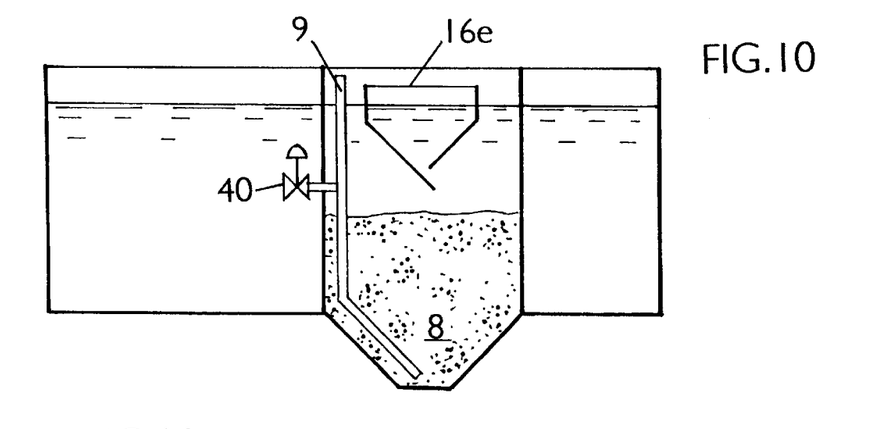
FIG. 10. is a section along lines A—A in FIG. 9.
Figure 11:
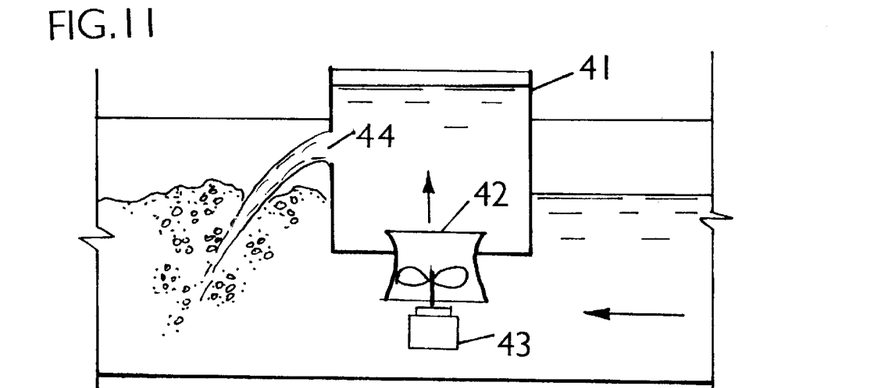
FIG. 11. is a section along lines B—B in FIG. 9.

Referring now to FIGS. 9, 10, and 11, there is shown an alternative apparatus for carrying out the present method. The apparatus comprises a tank 20 accommodating multiple biological treatment zones arranged in the racetrack manner. The first treatment zone comprises reactor 14c. The second biological treatment zone is made of the reactor 14d. The third biological treatment zone is the reactor 14e coupled with the sludge separator 16e. The influent feed pipe 1 is connected to the system between the first and the third biological treatment zones, or between reactors 14e and 14c. The effluent pipe 5 is connected to the sludge separator 16e. A sludge conditioning zone 18 is provided under the said sludge separator 16e. This zone has pipes 9 with valves 40 (preferably automatic valves) for transferring the conditioned sludge to the reaction zone 14d. Aeration means 41 are provided between reactor 14d and reactor 14e. Multiple (three) impingement jet aerators 41 are shown. These aerators comprise a box 41 elevated above the bottom in the tank 20 and having a discharge orifice 44 and an intake 42 with a pumping means 43.

Optionally, line 53 with a valve 52 connect the box 41 of the aerator with the entrance section of the anoxic zone 14c. An oxygen probe 50 is installed in zone 14c at a short distance from the zone entrance. A pH probe 51 is installed in the anaerobic zone 14d. Probes 50 and 51 are connected to a computing means such as programmable logic controller (PLC). PLC generates and sends control signals to the actuating devices. In this system, aerators 41 and valves 40 and 52 can be actuated.

The apparatus shown in FIGS. 9, 10, and 11 is operated as follows. Wastewater is fed via line 1 at the entrance of the anoxic biological treatment zone 14c. A circulating flow of mixed liquor also flows in this zone from the aerobic biological treatment zone 14e. The wastewater influent and the circulating flows are mixed and the flow proceeds trough the anaerobic biological treatment zone 14d. At the end of this zone, the wastewater is aerated and propelled by the same aerators in the aerobic treatment zone 14e. Optionally, separate means can be used for aeration and propelling. The flow passing the aerobic treatment zone 14e is split into two portions. The first portion, approximately equal to the influent flow or to the equalized effluent flow, goes in the sludge separator 16e. The second portion, the recirculating flow, goes in the biological treatment zone 14c.

In the sludge separator, the sludge settles down in the sludge conditioner 8, and the clarified effluent is discharged via the effluent pipe 5. Optionally, part of the treated effluent is recycled to a selected biological treatment zone.

In the sludge conditioner 8, the separated sludge is treated and converted as previously described. Optionally, multiple channels for the sludge conditioning can be used. The conditioned sludge is controllably delivered to the anaerobic treatment zone 14d. Optionally, the digestion gases can be collected and transferred to the aerobic treatment zone 14e. This can be done with or without pumping means.

The following transformations of organics occur in the system: denitrification in the anoxic zone 14c, anaerobic degradation in zone 14d, aerobic degradation and nitrification in zone 14e. Acinetobacter or other P-removing microorganisms release phosphorus in the anoxic-anaerobic zones 14c and 14d and have an enhanced phosphorus uptake in zone 14e. Toxic and recalcitrant organics are transformed as previously described.

The system shown in FIGS. 9, 10, and 11 can be automatically controlled. For example, the oxygen probe 50 senses the oxygen concentration. If the measured concentration exceeds the preset limit (a small fraction of a milligram per liter), the PLC turns at least one aerator off. If the oxygen concentration remains excessive with a single aerator running, mixed liquor from the anaerobic zone 14d lifted in the aeration box 41 is recycled via line 53 upon opening valve 52 to the entrance of the anoxic zone 14c. This recycle reduces aeration in zone 14e and brings additional organics to the anoxic zone 14c, thus further depleting oxygen in this zone. In the anaerobic zone 14d, the pH probe 51 senses the pH value. If it is below the lower preset level, the PLC opens at least one valve 40 thus providing more methanogens in the anaerobic zone 14d and depleting the volatile fatty acids to the desired level. When pH probe registers an excessively high reading, PLC closes valves 40. It is understood that there are no strongly defined borders between zones 14c, 14d, and 14e. Accordingly, locations of these zones may shift depending mainly on the flow rates and concentrations of the influent. The influent and ambient temperatures, pH and other factors can also cause shifting.

The system shown in FIGS. 9, 10, and 11, a horizontal layout, has the same advantages as the system shown in FIGS. 6, 7, and 8, a vertical layout. The horizontal layout can be preferred for upgrading existing plants with multiple rectangular channels next to each other. It is therefore understood that the new method has many advantages. It provides greater treatment efficiency and stability at a lesser cost.

It will therefore be understood by those skilled in the art that particular embodiments of the invention here presented are by way of illustration only, and are meant to be in no way restrictive; therefore numerous changes and modifications may be made, and the full use of equivalents resorted to, without departing from the spirit and the scope of the invention as outlined in the appended claims.

What is claimed is:

1. A method of biological treatment of materials by a combination of at least two groups of microorganisms forming sludges in at least two biological treatment zones treating the said materials wherein for purposes of increasing the treatment efficiency and stability at least one of the said sludges is conditioned in at least one sludge conditioning zone, whereby converting at least a fraction of at least one said group of organisms into organisms of another group, and thus forming the conditioned sludge, and the said conditioned sludge is fed in at least one said biological treatment zone.

2. The method as claimed in claim 1, wherein the said materials are selected from the group consisting of water, wastewater, aqueous industrial, agricultural and production materials, industrial, agricultural and production gases including polluted air, gaseous and vent emissions, solid waste, materials of plant, animal, or fossil origin, and solid industrial, agricultural or production streams, and combinations thereof.

3. The method as claimed in claim 1, wherein the connection of the said biological treatment zones is selected from the group consisting of sequential treatment zones, parallel treatment zones, parallel-sequential treatment zones, treatment zones in a racetrack arrangement, and treatment zones with recirculation of the said materials and the said sludge among and between the said biological treatment zones.

4. The method as claimed in claim 1, wherein the said biological treatment zone is selected from the group consisting of a single biological reactor, a biological reactor-sludge separation system, a biological reactor-sludge separation-sludge recycle system, and biological reactors with internal recycle of the said materials and the said sludges.

5. The method as claimed in claim 4, wherein the said biological reactor is selected from the group consisting of a completely mixed stirred reactor, plug flow reactor, diffusional flow reactor, multichamber reactor, packed bed upflow reactor, packed bed downflow reactor, suspended sludge blanket reactor, fluidized bed reactor, expanded bed reactor, reactor with rotating contact media, and reactor with internal recirculation of the said materials and the said sludges.

6. The method as claimed in claim 1, wherein the said microorganisms are selected from the group consisting of attached growth and suspended growth organisms.

7. The method as claimed in claim 1, wherein the said organisms are selected from the group consisting of obligate aerobic, facultative aerobic, anoxic, facultative anaerobic, and obligate anaerobic microorganisms.

8. The method as claimed in claim 1, wherein the said microorganisms are selected from the group consisting of psycrophylic, mesophylic, and thermophylic microorganisms.

9. The method as claimed in claim 1, wherein the said at least one sludge conditioning zone is selected from the group consisting of a single tank reactor, a single tank reactor with a bypass, a multiple tank reactor, a multiple tank reactor with a bypass, a multiple tank sequential reactor, a multiple tank parallel flow equal volume reactors, a multiple tank parallel flow unequal volume reactors, a multiple tank parallel reactors with equal flow rate of said sludges to said parallel reactors, a multiple tank parallel reactors with different flow rate of said sludges to said parallel reactors, and combinations of these reactors.

10. The method as claimed in claim 1, and further providing multiple said sludge conditioning zones whereby a separate conditioning of said sludges or a split-flow conditioning of at least one said sludge are conducted.

11. The method as claimed in claim 1 wherein the said biological treatment zones are selected from the group consisting of obligate anaerobic treatment zone, anaerobic treatment zone, facultative treatment zone, anoxic treatment zone, aerobic treatment zone, and obligate aerobic treatment zone.

12. The method of claim 11 and further comprising steps of generating digestion gases in the said obligate anaerobic treatment zone, anaerobic treatment zone, facultative treatment zone, and using the said gases in the said method of biological treatment of materials.

13. The method of claim 1 and further comprising a step of controllable aeration.

14. The method of claim 1 and further comprising steps of controllable feed of the said materials, or the said sludges, or their mixtures between the said biological treatment zones.

15. The method of claim 1, wherein the said microorganisms are selected from the group consisting of autotrophic and heterotrophic microorganisms, and combinations thereof.

16. The method of claim 1, wherein the said at least two biological treatment zones are in a race track arrangement.

17. The method of claim 16, and further the said at least two biological treatment zones are selected from the group consisting of an anoxic biological treatment zone, an anaerobic biological treatment zone, an aerobic biological treatment zone, a facultatively anaerobic biological treatment zone, and combinations thereof.

18. A method of biological treatment of materials in at least two biological treatment zones selected from the group consisting of an anoxic biological treatment zone, an anaerobic biological treatment zone, an aerobic biological treatment zone, a facultatively anaerobic biological treatment zone, and combinations thereof, and further providing a conditioned sludge in at least one of the said at least two biological treatment zones.

19. The method of claim 18, wherein the arrangement of the said at least two biological treatment zones is selected from the group consisting of race track, parallel zones, parallel-sequential zones, zones with recirculating of flows between and among the said at least two biological treatment zones, and combinations thereof.

* * * * *